Nov. 12, 1935.  A. L. FREEDLANDER  2,020,542
BELT CONNECTER
Filed Feb. 12, 1934  2 Sheets-Sheet 1
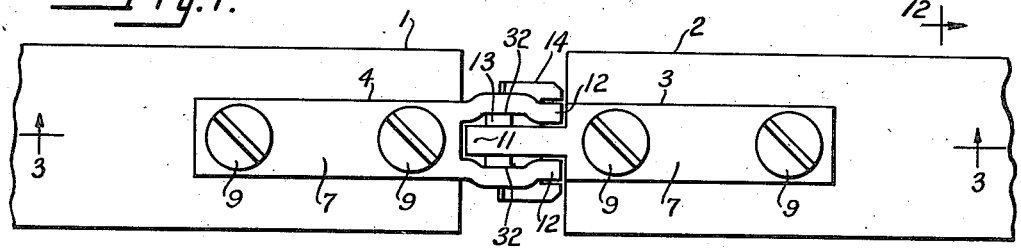
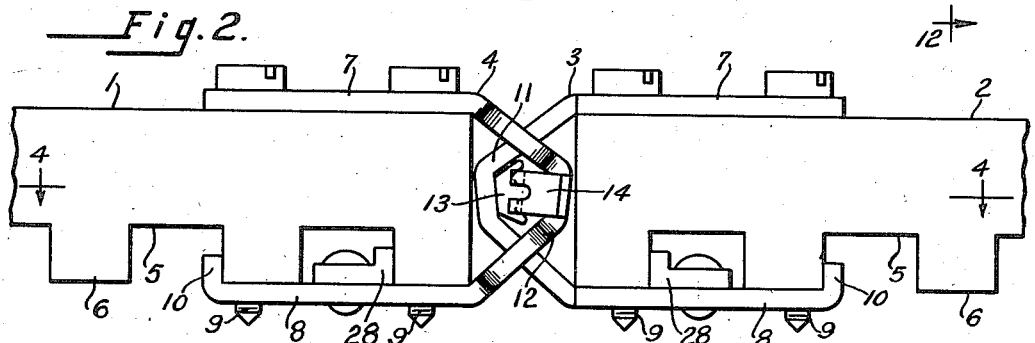
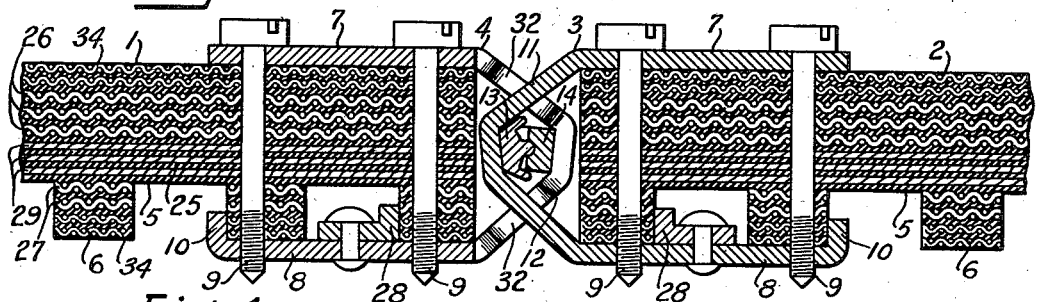
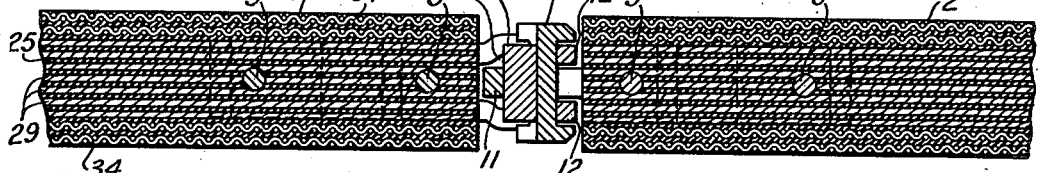
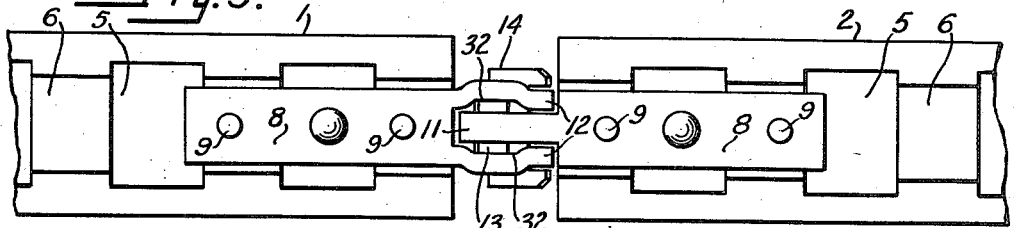
INVENTOR
ABRAHAM L. FREEDLANDER.
BY
ATTORNEYS Nov. 12, 1935.    A. L. FREEDLANDER    2,020,542
BELT CONNECTER
Filed Feb. 12, 1934    2 Sheets-Sheet 2
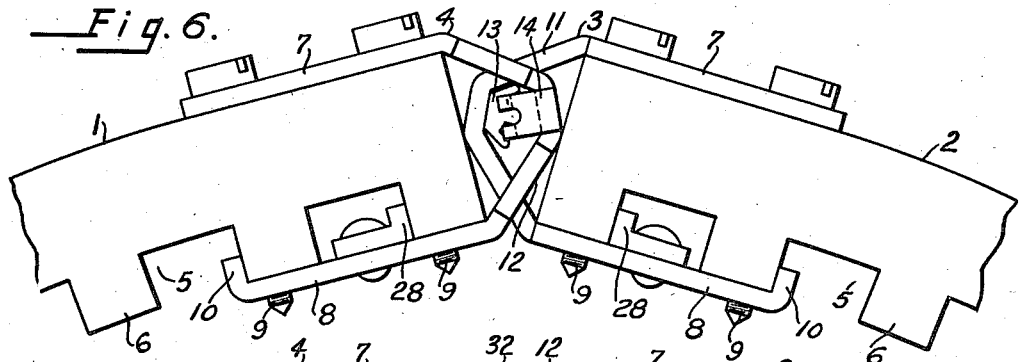
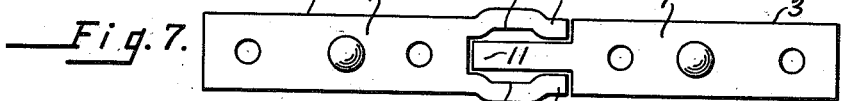
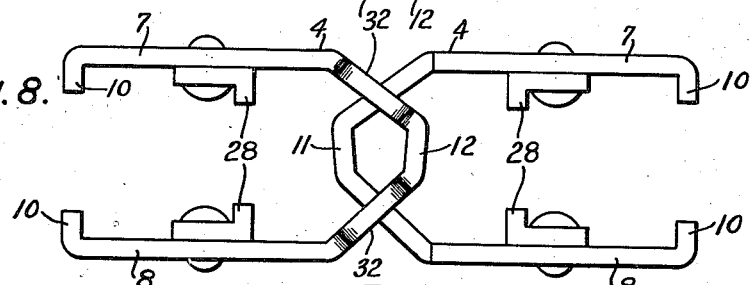
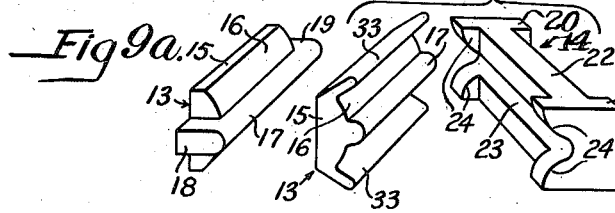
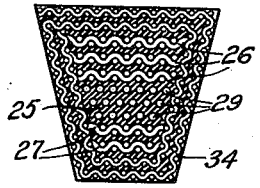
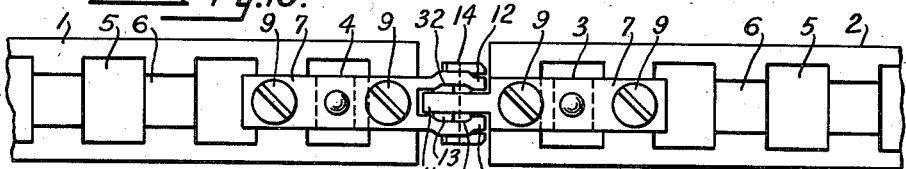
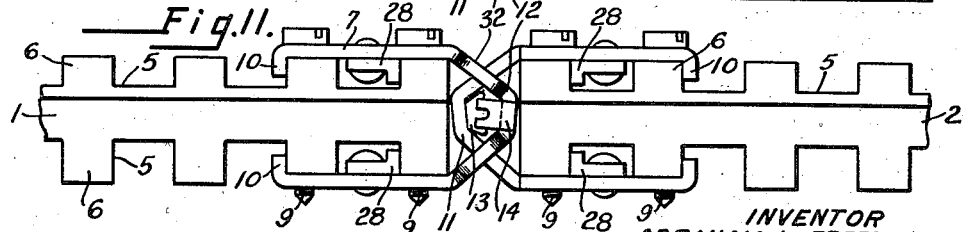
INVENTOR
ABRAHAM L. FREEDLANDER.
BY
ATTORNEYS Patented Nov. 12, 1935

2,020,542

UNITED STATES PATENT OFFICE 2,020,542

BELT CONNECTER

Abraham L. Freedlander, Dayton, Ohio, assignor to The Dayton Rubber Manufacturing Company, Dayton, Ohio, a corporation of Ohio Application February 12, 1934, Serial No. 710,822

14 Claims. (Cl. 24—33)

This invention relates to belt connecters and especially to belt connecters having interlacing clamping members and pintle members held therebetween.

The problem of the inventor was to provide a belt connecter of the above type which would incorporate means enabling the belt to adjust itself laterally by a slight amount when the pulleys which is connected became slightly out of line.

One object of the invention is to provide a belt connecter with interlacing clamping members and pintle members supported thereby, one or both of these clamping members being cut away to provide lateral adjustability of the two clamps relative to one another.

Another object is to provide a cut-away clamping member of the above type in combination with interengaging pintle members held between the two clamps.

Another object is to provide a belt connecter with clamping members having intermediate lugs which engage cut-away portions of the belt in order to provide a strong grip on the belt.

Another object is to provide such a belt connecter with cut-away clamping members, adapted either for use with belts of trapezoidal, hexagonal or other cross section.

In the drawings:

Figure 1 is a plan view of the belt connecter of my invention as applied to a belt of trapezoidal cross section;

Figure 2 is a side elevation of the belt and belt connecter shown in Figure 1;

Figure 3 is a vertical section along the line 3—3 of Figure 1;

Figure 4 is a horizontal section along the line 4—4 of Figure 2;

Figure 5 is a bottom plan view of the belt connecter and belt shown in Figures 1 to 4 inclusive;

Figure 6 is a side elevation of the belt connecter of my invention, showing its operation when the belt is passing around a pulley, thereby placing the belt ends at an angle to one another;

Figure 7 is a top plan view of the clamping members or clips of my belt connecter, in their interlacing position;

Figure 8 is a side elevation of the belt clips shown in Figure 6;

Figure 9 is a perspective view of the two pintle members used in combination with the belt clips or clamping members of my invention;

Figure 9a is a view showing a modified form of the male element;

Figure 10 is a plan view of the belt connecter of my invention as applied to a belt of hexagonal cross section;

Figure 11 is a side elevation of the belt and belt connecter shown in Figure 10;

Figure 12 is a cross section, in reduced scale, along the line 12—12 of Figure 1.

Referring to the drawings in detail, in Figure 1 is shown a belt of rubber-and-fabric construction having ends 1 and 2 joined by oppositely-disposed clamping members or clips 3 and 4. The belt shown is optionally provided with cut-away portions 5, thereby providing projections 6 which give the belt greater flexibility in its own plane, and enable the inner surface of the belt to shorten relative to the outer surface, as tends to occur when the belt passes around a pulley. It is understood, however, that the tooth-like portions 5 and 6 may be omitted if desired, and the connecter of my invention applied to a belt without such cut-away portions, without exceeding the scope of my invention.

The clamping members 3 and 4 of the belt connecter are bent approximately in the shape of the letter "C" with elongated tops and bottoms 7 and 8 respectively. The latter are held together with the belt between them by the clamping screws 9. Where, as shown for purposes of illustration, the belt possesses the cut-away portions 5, the ends 10 of the upper and lower arms of the clamping portions may be angled to grasp the corner of the tooth-like portions more firmly. In the clamping members shown, the bent ends 10 engage the second cut-away portion 5 beyond the ends of the belt. The first cut-away portion 5 is engaged by the intermediate lugs 28, which bear against the corner thereof and provide an additional grip on the belt.

The clamping members 3 and 4 are provided with inter-penetrating or interlacing portions 11 and 12 respectively. The latter are arranged to provide space for the reception of the pintle members 13 and 14 which serve to carry the load between the opposite ends of the belt, as well as to supply a bearing arrangement between them.

One of the clamping members, such as 4, is provided with cut-away portions 32. These permit the portions 11 and 12 to move angularly relative to one another in a lateral direction, yet without blinding against the walls of their respective interlacing portions 11 and 12. The purpose of this arrangement is to permit the belt to maintain a free and self-adjusting connection when the pulleys which the belt connects are placed out of line with one another. Such belts are frequently used in driving generators from the trucks of train coaches. When the train rounds a curve, the two pulleys occasionally get out of line, so that their planes no longer coincide. With an ordinary belt connecter lacking the cut-away portions 32, the interlacing tongues bind against one another and rapid wear results. This wear may eventually become serious enough to cause breakage of the belt connecter and place the machine out of operation entirely. My construction, however, enables the tongue 11 to move laterally and angularly relative to the tongue 12 without such wear occurring, yet a driving connection is still maintained.

The interlacing members or tongues 11 and 12 are arranged to provide a space between their forward ends to receive the pintle members 13 and 14. These pintle members 13 and 14 are in the form of elongated pins adapted to engage one another. The male pintle member 13 is provided with a body portion 15, preferably with an arcuate surface 16 and a rib or a similar bearing projection 17 extending therealong. The latter may be extended beyond each end of the body portion 15 to provide the end shoulder ribs 18 and 19. The female pintle member 14 is arranged with flanged ends or heads 20 and 21 extending beyond its body portion 22. The female pintle member 14 is provided with a groove 23 running along its body portion 22 and through the heads 20 and 21, if desired. When the groove 23 is so extended through the heads, the latter are cut away on either side as at 24 to provide a free rocking engagement of the extended end portions 18 and 19 of the male pintle member 13. In this manner the end heads prevent endwise motion of the pintle members relative to one another, and the cut-away portion 24 prevents the dislodgment of the pintle parts transversely when the belt is in operation.

The belt is preferably of trapezoidal or hexagonal cross section, and is desirably of rubber-and-fabric construction. In such a construction the neutral axis 25 is provided with a plurality of cords 29 imbedded therein and so tightly twisted that they are relatively inextensible. This causes the belt to be substantially constant in length along its neutral axis without longitudinal extensibility. At the same time, however, the outer portion 26 of the belt is arranged with fabric of such construction as to provide it with a certain amount of longitudinal extensibility. The inner portion 27, on the other hand, is of a different construction, that it provides a slight amount of longitudinal contractibility, this being increased by the cut-away portions 5. The belt is, however, without substantial sidewise expansion or contraction so that the width of its cross section remains approximately constant. The foregoing construction, however, gives the belt sufficient flexibility in the plane of its pulleys so that it may easily and freely flex in passing around large and small pulleys.

In assembling the belt parts, the tongues 11 and 12 of the clamping members or clips 3 and 4 are interlaced (Figure 1) and the pintle members 13 and 14 placed in engagement therebetween with the ridge 17 of one bearing in the groove 23 of the other. The body portion 15 of the male pintle member 13 is, however, held between the end flanges 20 and 21 of the female pintle member 14. The belt ends 1 and 2 are now inserted between the arms 7 and 8 of the clamping members 3 and 4 and secured in position by the clamping screws 9. If the clamping members 3 and 4 are of the pattern shown (Figures 7 and 8), so that the belt ends 10 engage the second cut-away portions 5 of the belt, the intermediate lugs 28 are made to engage the first cut-away portions 5.

With a belt of hexagonal cross section, both the upper and lower arms 7 and 8 have belt ends 10 and intermediate lugs 28. With a belt of trapezoidal cross section, however, the upper cut-away portions are usually absent, hence the arms 7 of the clamps 3 and 4 will usually lack the belt ends 10 and intermediate lugs 28. It will be understood, however, that the upper surface of the belt may be recessed to admit the portions 10 and 28, if desired. It will also be understood that the intermediate lugs 28 may be omitted entirely and the angled ends 10 be made to grip the first cut-away portion 5 of the belt, if desired; and also that the screws 9 in the latter instance may be placed side by side instead of in line longitudinally, as shown in Figure 1.

In operation, as the belt passes along a straight run between pulleys, the ends will be in line with one another in the position shown in Figure 1. When the belt ends pass around a pulley, however, the belt ends will bend relative to one another and assume the positions shown in Figure 6. The male pintle portion 13 will then rock in the female pintle portion 14, yet the two pintle members will be prevented from dislodgment by the end portions 18 and 19 of the ridge 17 and the corners 24 of the flanged heads 20 and 21. Meanwhile the latter hold the body portion 15 from moving endwise relative to the opposite pintle member.

As an alternate construction, one of the pintle members may be provided with edge projections 33 which will prevent dislodgment of the pintle parts in a transverse direction. In this case, the flanged heads 20 and 21 may be made solid, without causing the groove 23 to pass therethrough, and without cutting away this groove, as at 24.

In either of the above manners, the dislodgment or "cocking" of the two pintle members is effectively prevented. At the same time, the provision of the clearance 32 in the belt clamping members 11 and/or 12 provide a measure of self-adjustment in a lateral direction of one belt end relative to the other. Thus the belt may connect pulleys which are slightly out of line with one another and at the same time sustain hard service without serious wear and without dislodgment of the pintle members.

The belt may be provided with a wrapper 34, or may be used without a wrapper, as desired. When a wrapper 34 is provided, it is found preferable to lay the fabric with its threads in a diagonal direction (Figure 1). This bias-laid fabric provides greater flexibility than a straight-laid fabric, in permitting the belt to flex more readily under operating conditions.

It will be understood that I desire to comprehend within my invention such modifications as may be necessary to adapt it to varying uses and conditions.

Having thus fully described my invention, what I claim as new and desire to secure by Letters Patent is:

1. A belt connecter comprising clamping members having interlacing nose portions and bearing means therebetween, one of said clamping members having a single nose portion and the other having a bifurcated nose portion with an enlarged spacing of its arms at the location where it receives the single nose portion of the opposite clamping member, said spacing being substantially greater than the width of the single nose portion whereby to provide lateral adjustability and flexing of one clamping member relative to the other.

2. A belt connecter comprising clamping members having interlacing nose portions and interengaging pintle members held therebetween, one of said pintle members having means for preventing the dislodgment of said pintle members during operation, one of said clamping members having a single nose portion and the other having a bifurcated nose portion, the arms of said bifurcated nose portion having a spacing therebetween which is substantially greater than the width of the single nose portion whereby to provide lateral adjustability and flexing of the other clamping member relatively thereto.

3. A belt connecter comprising clamping members having interlacing nose portions and interengaging pintle members held therebetween, one of said pintle members having flanged grooved ends adapted to receive projections on the opposite pintle member to provide rocking engagement yet positive holding against dislodgment, one of said clamping members having a single nose portion and the other having a bifurcated nose portion, the arms of said bifurcated nose portion having a spacing therebetween which is substantially greater than the width of the single nose portion whereby to provide lateral adjustability and flexing of the other clamping member relatively thereto.

4. A belt connecter comprising clamping members having interlacing nose portions and interengaging pintle members held therebetween, one of said pintle members having flanged grooved ends adapted to receive projecting ridges on the opposite pintle member to provide rocking engagement yet positive holding against dislodgment, one of said clamping members having a single nose portion and the other having a bifurcated nose portion, the arms of said bifurcated nose portion having a spacing therebetween which is substantially greater than the width of the single nose portion whereby to provide lateral adjustability and flexing of the other clamping member relatively thereto.

5. A belt connecter comprising clamping members having interlacing nose portions and interengaging pintle members held therebetween, one of said pintle members having edge projections for preventing the dislodgment of said pintle members during operation, one of said clamping members having a single nose portion and the other having a bifurcated nose portion, the arms of said bifurcated nose portion having a spacing therebetween which is substantially greater than the width of the single nose portion whereby to provide lateral adjustability and flexing of the other clamping member relatively thereto.

6. A belt connecter comprising clamping members having interlacing nose portions and interengaging pintle members held therebetween, one of said pintle members having angularly disposed edge projections therealong for preventing the dislodgment of said pintle members during operation, one of said clamping members having a single nose portion and the other having a bifurcated nose portion, the arms of said bifurcated nose portion having a spacing therebetween which is substantially greater than the width of the single nose portion whereby to provide lateral adjustability and flexing of the other clamping member relatively thereto.

7. A belt connecter for belts having notched portions comprising interlaced clamping members having bearing means therebetween, each clamping member having arms adapted to grip the ends of the belt, and means interconnecting the arms through the belt, one of said arms being provided with an angled end and an intermediate projection spaced apart therefrom whereby to engage different notched portions respectively in the end of the belt and to distribute the thrust over a plurality of notched portions on each end of the belt.

8. A belt connecter for belts having notched portions comprising interlaced clamping members having bearing means therebetween, each of said clamping members having oppositely-disposed arms adapted to grip the ends of the belt therebetween, and means interconnecting the arms through the belt, each arm being provided with an angled portion on one end, and an intermediate projection adjacent to said end, said angled portion and said projection being spaced apart from one another whereby to engage different notched portions respectively in the belt and to distribute the thrust over a plurality of notched portions on each end of the belt.

9. A belt connecter for belts having notched portions comprising interlaced clamping members having bearing means therebetween, each of said clamping members having oppositely-disposed arms adapted to grip the ends of the belt therebetween, and means interconnecting the arms through the belt, each arm being provided with an angled portion on one end, and an intermediate projection adjacent to said end, said angled portion and said projection being spaced apart from one another whereby to engage different notched portions respectively in the belt and to distribute the thrust over a plurality of notched portions on each end of the belt, the interlacing portions of one of said clamping members being widely spaced whereby to provide a cutaway portion adapted to provide lateral adjustability of the other clamping member relatively thereto.

10. A belt connecter comprising clamping members having interlacing nose portions and interengaging pintle members held therebetween, one of said pintle members having a groove adapted to receive a projection on the opposite pintle member to provide rocking engagement therewith, the said projection being deeper than the said groove, one of said clamping members having a single nose portion and the other having a bifurcated nose portion, the arms of said bifurcated nose portion having a spacing therebetween which is substantially greater than the width of the single nose portion whereby to provide lateral adjustability of the other clamping member relatively thereto.

11. A belt connecter comprising clamping members having interlacing nose portions and inter-engaging pintle members held therebetween, one of said pintle members having a groove adapted to receive a projection on the opposite pintle member to provide rocking engagement therewith, the said projection being deeper than the said groove, one of said clamping members having a single nose portion and the other having a bifurcated nose portion, the arms of said bifurcated nose portion having a spacing therebetween which is substantially greater than the width of the single nose portion whereby to provide lateral adjustability of the other clamping member relatively thereto, one of said pintle members being provided with edge projections adapted to prevent dislodgment of said pintle members from one another during operation.

12. A belt connecter comprising clamping members having interlacing nose portions and inter-engaging pintle members held therebetween, one of said pintle members having a groove adapted to receive a projection on the opposite pintle member to provide rocking engagement therewith, the said projection being deeper than the said groove, one of said clamping members having a single nose portion and the other having a bifurcated nose portion, the arms of said bifurcated nose portion having a spacing therebetween which is substantially greater than the width of the single nose portion whereby to provide lateral adjustability of the other clamping member relatively thereto, one of said pintle members having flanged grooved ends adapted to receive lateral extensions of the rib on the opposite pintle member to provide rocking engagement with positive holding against dislodgment.

13. A belt connecter comprising clamping members having interlacing nose portions and inter-engaging pintle members held therebetween, one of said pintle members having a groove adapted to receive a projection on the opposite pintle member to provide rocking engagement therewith, the said projection being deeper than the said groove; one of said clamping members having a single nose portion and the other having a bifurcated nose portion, the arms of said bifurcated nose portion having a spacing therebetween which is substantially greater than the width of the single nose portion whereby to provide lateral adjustability of the other clamping member relatively thereto, one of said pintle members having a face of arcuate configuration.

14. A belt connecter comprising interlaced clamping members having inter-engaging pintle members held therebetween, one of said pintle members having a groove adapted to receive a projection on the opposite pintle member to provide rocking engagement therewith, the said projection being deeper than the said groove, one of said clamping members being cut away to provide lateral adjustability of the other clamping member relatively thereto, one of said pintle members being provided with edge projections adapted to prevent longitudinal dislodgment of said pintle members from one another during operation, one of said pintle members having edge projections adapted to prevent the transverse dislodgment of said pintle members.

ABRAHAM L. FREEDLANDER.